US012589701B1

(12) United States Patent
Conelli

(10) Patent No.: US 12,589,701 B1
(45) Date of Patent: Mar. 31, 2026

(54) APPARATUS FOR MOVING A CAMERA OR THE LIKE

(71) Applicant: David Conelli, Garden City, NY (US)

(72) Inventor: David Conelli, Garden City, NY (US)

( * ) Notice: Subject to any disclaimer, the term of this patent is extended or adjusted under 35 U.S.C. 154(b) by 186 days.

(21) Appl. No.: 18/369,170

(22) Filed: Sep. 17, 2023

Related U.S. Application Data

(60) Provisional application No. 63/408,925, filed on Sep. 22, 2022.

(51) Int. Cl.
*B60R 11/04* (2006.01)
*H04N 23/54* (2023.01)
*H04N 23/695* (2023.01)
*B60R 11/00* (2006.01)

(52) U.S. Cl.
CPC ............. *B60R 11/04* (2013.01); *H04N 23/54* (2023.01); *H04N 23/695* (2023.01); *B60R 2011/004* (2013.01); *B60R 2011/0084* (2013.01)

(58) Field of Classification Search
CPC .............. B60R 11/04; B60R 2011/004; B60R 2011/0084; H04N 23/695; H04N 23/54
USPC ......................................................... 348/148
See application file for complete search history.

(56) References Cited

U.S. PATENT DOCUMENTS

| | | | | |
|---|---|---|---|---|
| 7,012,637 | B1 * | 3/2006 | Blume ................... | H04N 23/90 348/E7.086 |
| 10,620,507 | B2 * | 4/2020 | Lefever ............... | G03B 17/561 |
| 2003/0076480 | A1 * | 4/2003 | Burbulla ............... | B66F 11/048 396/419 |
| 2005/0135904 | A1 * | 6/2005 | Wivagg ............... | G21C 17/013 414/222.01 |
| 2006/0175485 | A1 * | 8/2006 | Cramer .................... | B07B 9/00 248/184.1 |
| 2011/0008037 | A1 * | 1/2011 | Viggiano ............... | G03B 17/00 396/428 |
| 2011/0273612 | A1 * | 11/2011 | Chapman ............... | F16M 11/18 348/373 |
| 2015/0012168 | A1 * | 1/2015 | Kuklish ............... | F16M 11/425 701/23 |
| 2016/0052761 | A1 * | 2/2016 | Berry .................... | B66F 11/046 384/46 |
| 2016/0150159 | A1 * | 5/2016 | Lytle ...................... | H04N 23/50 348/208.3 |
| 2016/0191813 | A1 * | 6/2016 | Wu ........................ | H04N 23/58 348/159 |
| 2022/0005191 | A1 * | 1/2022 | Connor ................. | G06T 7/0012 |
| 2022/0230458 | A1 * | 7/2022 | Iwane ....................... | G06T 7/70 |

* cited by examiner

*Primary Examiner* — Matthew David Kim

(74) *Attorney, Agent, or Firm* — MacCord Mason PLLC

(57) ABSTRACT

A jib arm to receive a camera or the like and for moving in a mechanically-controlled path. The apparatus includes a jib arm support and a loop assembly attached to the jib arm support. The loop assembly may include a loop track laid out in a plane; a horizontally mounted and fixed boom and a loop follower connected between the loop track and the boom for coupling the horizontally mounted boom to the loop track. The apparatus may further include an elevator assembly attached to the boom for receiving the camera and for providing vertical movement thereof.

15 Claims, 16 Drawing Sheets

16

42'

42'

42"

44'

44"

46

16

APPARATUS FOR MOVING A CAMERA OR THE LIKE

This application claims the benefit of provisional application No. 63/408,925, filed Sep. 22, 2022, which is incorporated herein by reference in its entirety.

BACKGROUND

(1) Field

The present inventions relate generally to jib arms and, more particularly, to an apparatus for moving a camera or the like in a mechanically-controlled path.

(2) Related Art

In cinematography, a jib arm camera is any boom device used to mount a camera on one end, and a counterweight with camera controls on the other. In principle, it operates like a see-saw, with the balance point located closer to the counterweight, which allows the end of the arm with the camera to move through an extended arc.

Because the extended arc essentially defines the surface of a sphere, additional linkages and mechanisms are required when the camera is filming horizontally to maintain its desired spatial perspective horizontally. This adds complexity and introduces safety issues since the boom and the camera both need to be controlled in a coordinated fashion. This usually requires at least one additional operator. Further, if the jib arm camera is also mounted on a movable dolly or trailer or vehicle, other operators likely will be required. Having multiple and generally independent control systems and operators very quickly increases safety issues as additional failure modes add up.

Thus, there remains a need for an apparatus for moving a camera or the like in a mechanically-controlled path for various jib arm support geometries while, at the same time, may be adapted to provide additional directions of movement too.

SUMMARY

The present inventions are directed to a jib arm adapted to receive a camera or the like and for moving in a mechanically-controlled path. The apparatus includes a jib arm support and a loop assembly attached to the jib arm support. The loop assembly may include (i) a loop track laid out in a plane; (ii) a horizontally mounted and fixed boom and (iii) a loop follower connected between the loop track and the boom for coupling the horizontally mounted boom to the loop track. The apparatus may further include an elevator assembly attached to the boom for receiving the camera and for providing vertical movement thereof.

In one embodiment, the jib arm support is stationary. The stationary jib arm support may be selected from the group consisting of scaffolding, tripods, tables and combinations thereof.

In another embodiment, the jib arm support is movable. The movable jib arm support may be selected from the group consisting of trailers, dollies, motor vehicles and combinations thereof. In one embodiment, the movable jib arm support motor vehicle is an automobile vehicle.

The loop track laid out in a plane may be horizontally mounted. In one embodiment, the loop track laid out in a plane is generally circular. For example, the loop track laid out in a plane may be elliptical.

Preferably, the loop track laid out in a plane generally corresponds to the shape of the outer perimeter of the jib arm support to which the loop assembly is attached thereto. For example, the shape of the outer perimeter of the jib arm support to which the loop assembly is attached thereto is a generally circular, elliptical, square, rectangular, triangular, hexagonal or similar geometric shape.

In one embodiment, the boom is telescoping. Preferably, the telescoping boom is a multi-stage telescoping boom. The multi-stage telescoping boom may include a proximate section, a distal section; and an intermediate section connecting the proximate section and the distal section. In one embodiment, the multi-stage telescoping boom further includes a pair of spaced apart pulley wheels attached to the intermediate section for connecting the intermediate section and the distal section and a looped cable supported by the pair of spaced apart pulley wheels; wherein the intermediate section and the distal section are attached to opposite portions of the looped cable, whereby the intermediate section for connecting the intermediate section and the distal section is connected to the loop follower and is adapted to extend and to retract both the intermediate section and the distal section in response to the position of the loop follower on the loop track.

The apparatus may further include a counterweight attached to the proximate end of the boom. Also, the boom may be formed in a hexagonal cross-section. In one embodiment, the boom is formed in an asymmetrical hexagonal cross-section.

The apparatus may further include a mounting assembly attached to the proximate end of the boom. In one embodiment, the mounting assembly attached to the proximate end of the boom includes a powered motor and a slew ring located between the motor and the boom. The powered motor may be an electric worm drive motor.

In one embodiment, the loop follower connected between the loop track and the horizontally mounted boom for coupling the boom to the loop track is a trolley assembly including guide rollers.

For embodiments having an elevator assembly, the elevator assembly may include (i) a base attached to the distal end of the boom; (ii) a set of tracks laid out onto the base; (iii) and a camera dolly for receiving a camera or the like and adapted to move along the set of tracks. In one embodiment, the set of tracks is vertically oriented.

The elevator assembly may further include a camera mount attached to the dolly. The camera mount may be adapted to receive devices selected from the group consisting of lights, cameras, microphones and combinations thereof. Preferably, the camera mount is forwardly facing away from the dolly to provide the widest view.

Accordingly, one aspect of the present inventions is to provide a jib arm adapted to receive a camera or the like and for moving in a mechanically-controlled path, the apparatus comprising: (a) a jib arm support; and (b) a loop assembly attached to the jib arm support, the loop assembly including (i) a loop track laid out in a plane; (ii) a boom and (iii) a loop follower connected between the loop track and the boom for coupling the boom to the loop track.

Another aspect of the present inventions is to provide in a jib arm adapted to receive a camera or the like and for moving in a mechanically-controlled path and including a jib arm support, the improvement comprising: a loop assembly attached to the jib arm support, the loop assembly including (i) a loop track laid out in a plane; (ii) a horizontally mounted and fixed boom and (iii) a loop follower connected between the loop track and the horizontally mounted boom for coupling the boom to the loop track. Still another aspect of the present inventions is to provide a jib arm adapted to receive a camera or the like and for moving in a mechanically-controlled path, the apparatus comprising: (a) a jib arm support; (b) a loop assembly attached to the jib arm support, the loop assembly including (i) a loop track laid out in a plane; (ii) a horizontally mounted and fixed boom and (iii) a loop follower connected between the loop track and the boom for coupling the horizontally mounted boom to the loop track; and (c) an elevator assembly attached to the boom for receiving the camera and for providing vertical movement thereof.

These and other aspects of the present inventions will become apparent to those skilled in the art after a reading of the following description of the embodiments when considered with the drawings.

DESCRIPTION OF THE PREFERRED EMBODIMENTS

Figure 1:
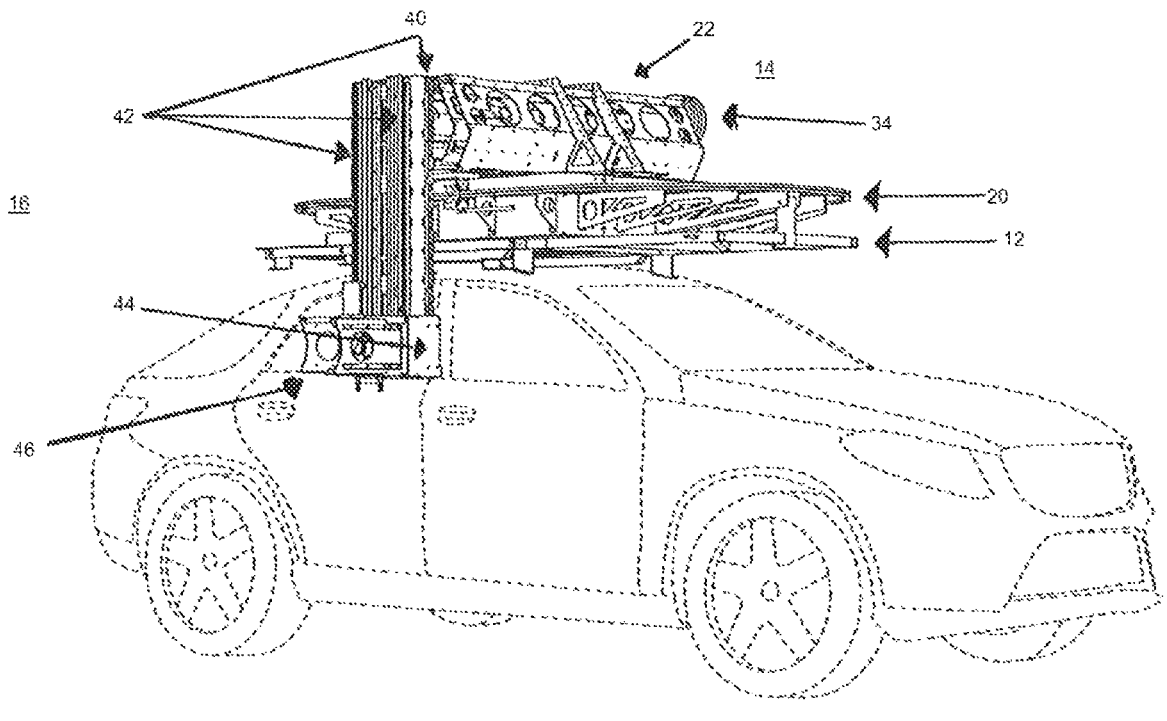
FIG. 1 is a front perspective view of a mounting system constructed according to the present inventions.

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Referring now to the drawings in general and FIG. 1 in particular, it will be understood that the illustrations are for the purpose of describing a preferred embodiment of the inventions and are not intended to limit the inventions thereto. As best seen in FIG. 1, a mounting system, generally designated 10, is shown constructed according to the present inventions. The mounting system 10 includes three major sub-assemblies: a jib arm support 12; a jib arm 14; and an elevator 16.

As seen in FIG. 1 the jib arm support 12 may be stationary or it may be adapted to be movable. The stationary jib arm support may be selected from the group consisting of scaffolding, tripods, tables and combinations thereof. The movable jib arm support is selected from the group consisting of trailers, dollies, motor vehicles and combinations thereof. In FIG. 1 the jib arm support 12 is shown attached to a vehicle and the jib arm 14 is attached to the jib arm support 12.

The jib arm 14 includes a loop track in a plane 20 onto which is mounted telescoping boom 22. Telescoping boom 22 rotates about the loop track in a plane 20 as will be discussed in more detail below.

An elevator 16 is attached to the distal end of telescoping boom 22. Elevator 16 includes a base 40 attached to the distal end of telescoping boom 22 and a pair of tracks 42', 42" on either side of elevator base 40. Elevator trolley 44 is adapted to move up and down elevator tracks 42', 42" as will be discussed below. A camera mount 46 is attached to elevator dolly 44. While the mounting system 10 being described is adapted for cinematography other devices could also be attached to camera mount 46. Mount 46 may be adapted to receive devices selected from the group consisting of lights, cameras, microphones and combinations thereof.

Figure 2:
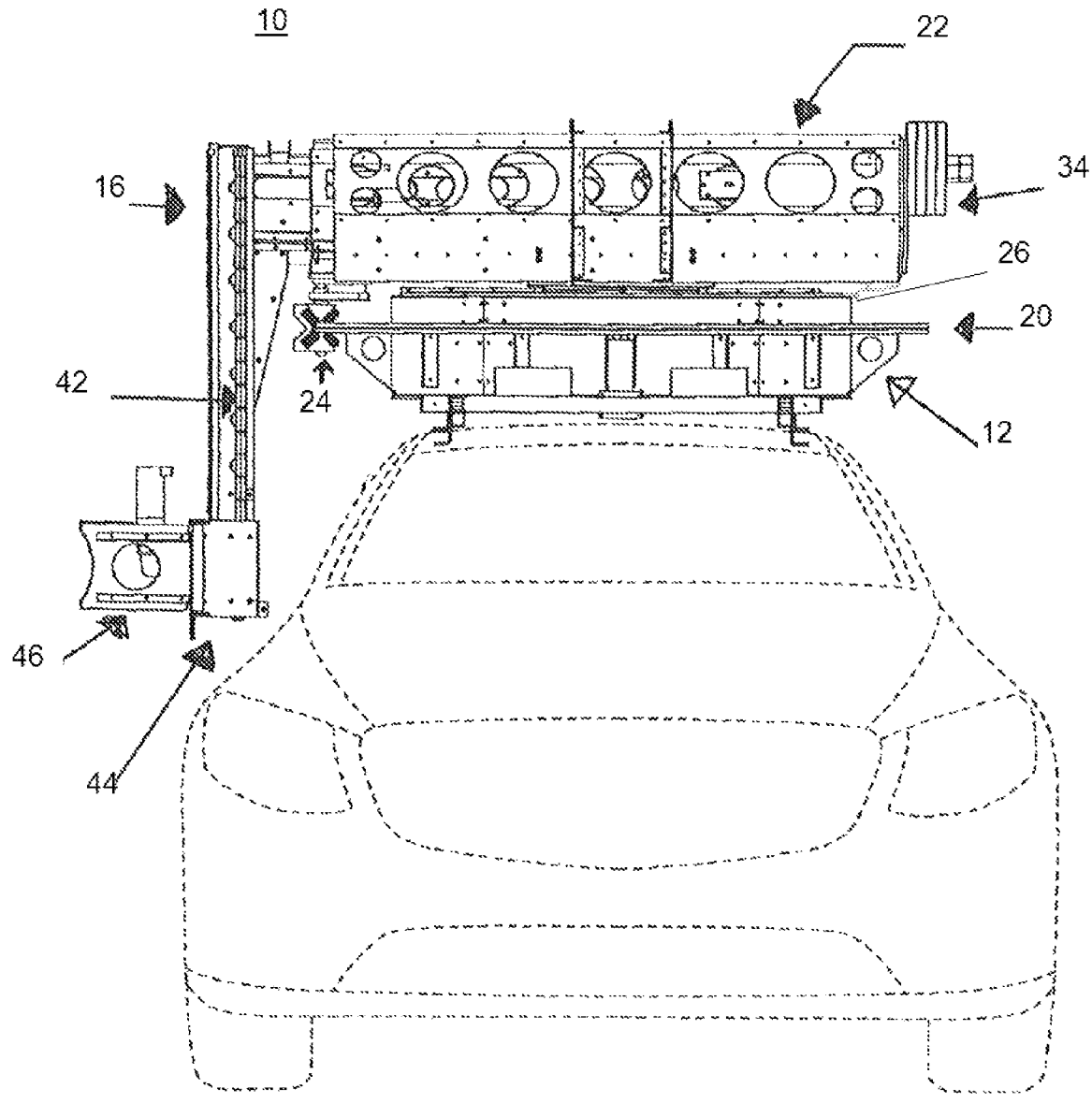
FIG. 2 is a front elevation view thereof.
Figure 3:
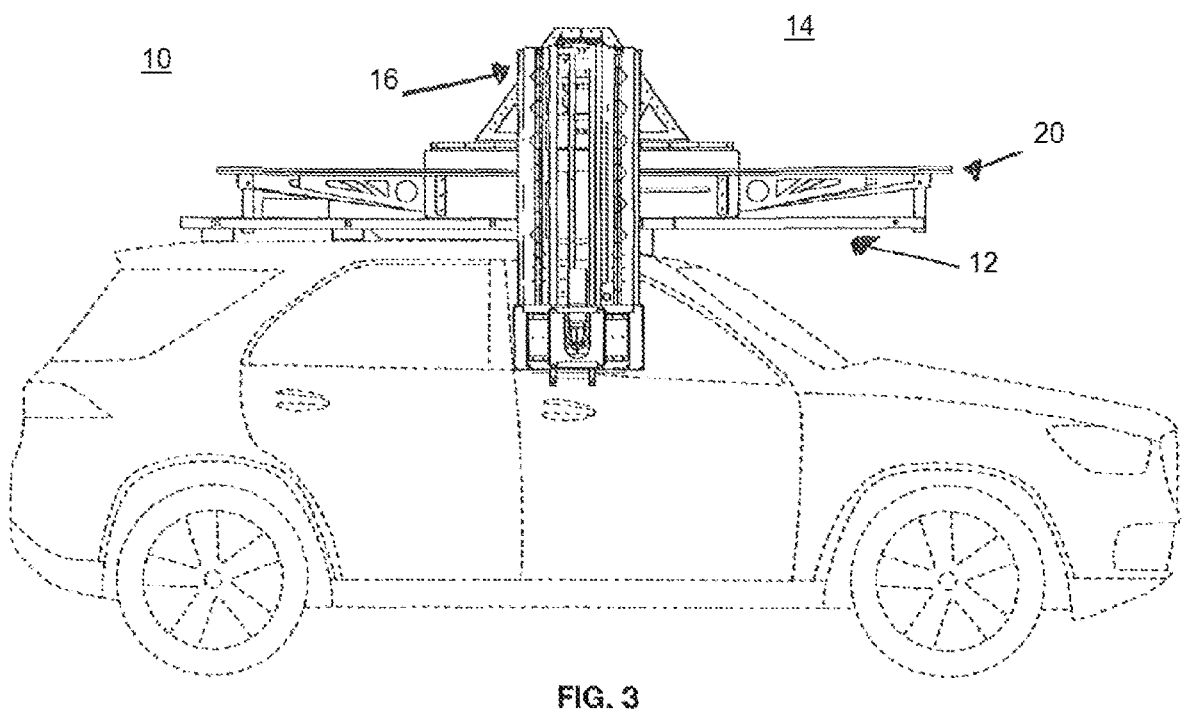
FIG. 3 is a left side elevation view thereof.

Turning to FIG. 2 there is shown a front elevation view of the mounting system 10. As best seen in FIG. 2, telescoping boom 22 is attached to jib arm support 12 by mount 26. Mount 26 includes a motor 30 and a slew ring 32 which will be discussed in more detail below. In a preferred embodiment the motor is a worm drive. The distal end of telescoping boom 22 includes a loop follower trolley 24 which moves in a path about loop track in a plane 20. As telescoping boom 22 rotates about mount 26, loop follower trolley 24 also rotates in a path along loop track in a plane 20. Loop track in a plane 20 is a continuous loop and generally corresponds to the envelope surrounding the vehicle to which mounting system 10 is attached whether it be a trailer or a dolly or a vehicle. Accordingly as telescoping boom 22 is rotated, the distal end also extends corresponding to the path determined by loop track in a plane 20. Since telescoping boom 22 does not require a motor for telescoping boom 22, the connection between the distal end of telescoping boom 22, loop track in a plane 20 and loop follower trolley 24 is determined by the mechanical connection between the three components Turning to FIG. 3 there is shown a left side elevation view of the mounting system 10. The 3 major sub-assemblies of the jib arm support 12; the jib arm 14 and the elevator 16 can be clearly seen.

Figure 4:
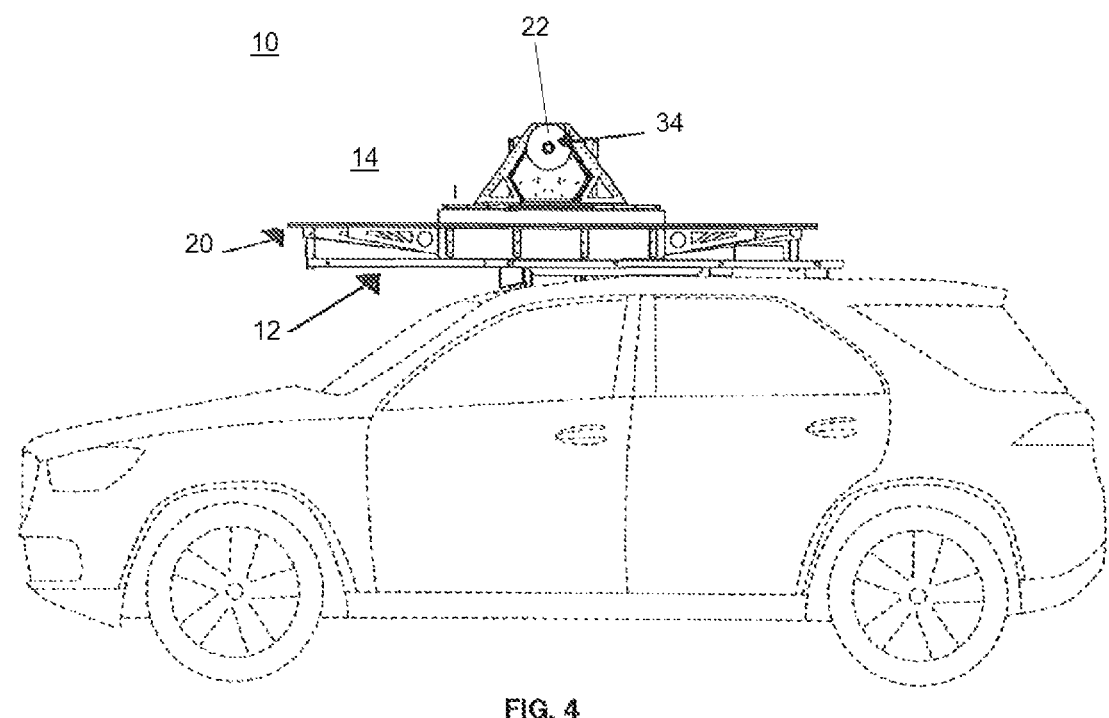
FIG. 4 is a right side elevation view thereof.

Turning to FIG. 4 there is shown a right side elevation view of the mounting system 10. The same major sub-assemblies discussed above can also be seen. In addition counterweight 34 attached to the proximate end of telescoping boom 22 can also be seen. Counterweight 34 may include a plurality of weight plates, as best seen in FIG. 2, which can be added to or subtracted from depending on the amount of weight of any devices attached to camera mount 46.

Figure 5:
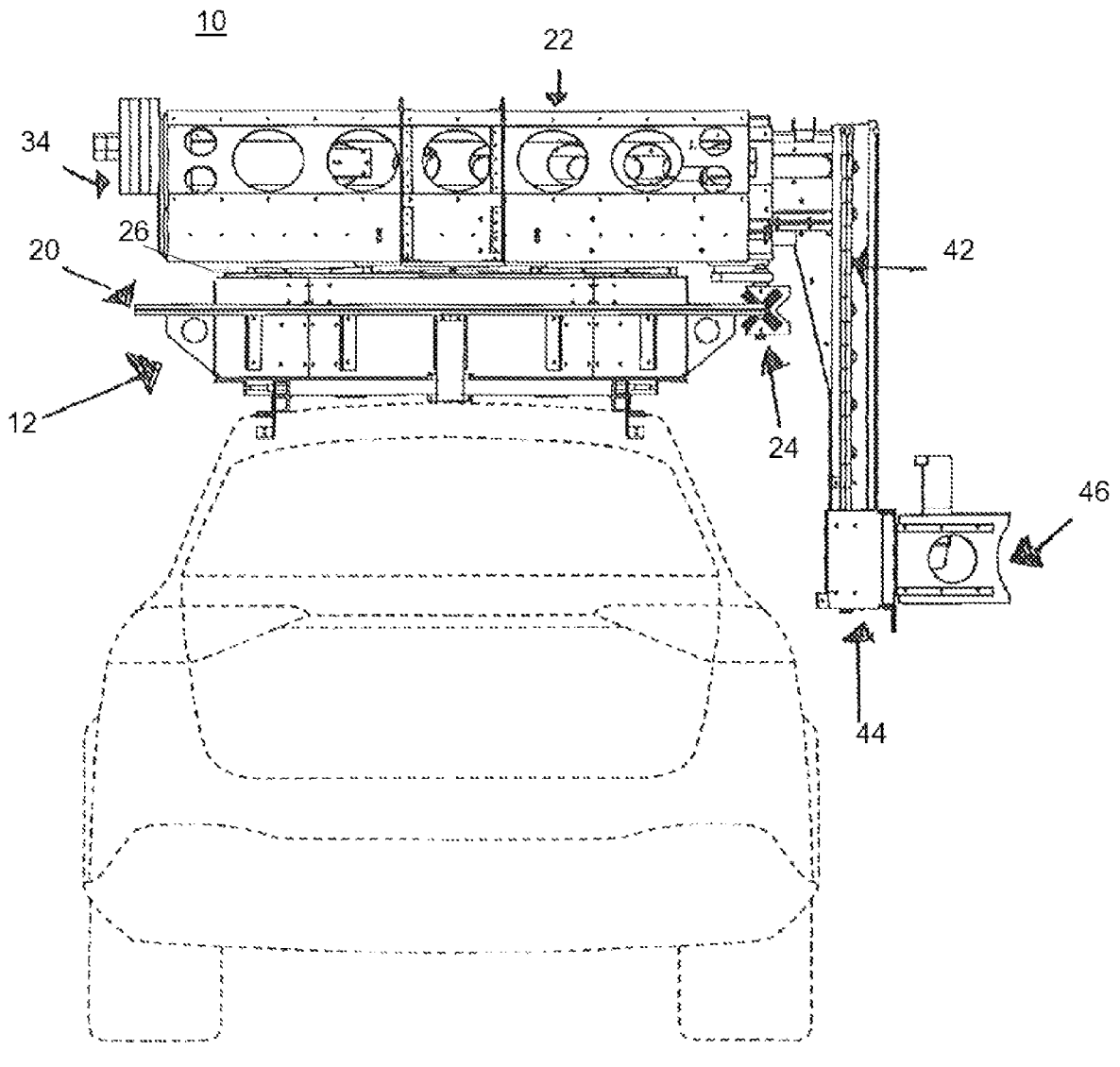
FIG. 5 is a rear elevation view thereof.

Turning now to FIG. 5, there is shown a rear elevation view of the mounting system 10 generally corresponding to the elements shown in FIG. 2.

Figure 6:
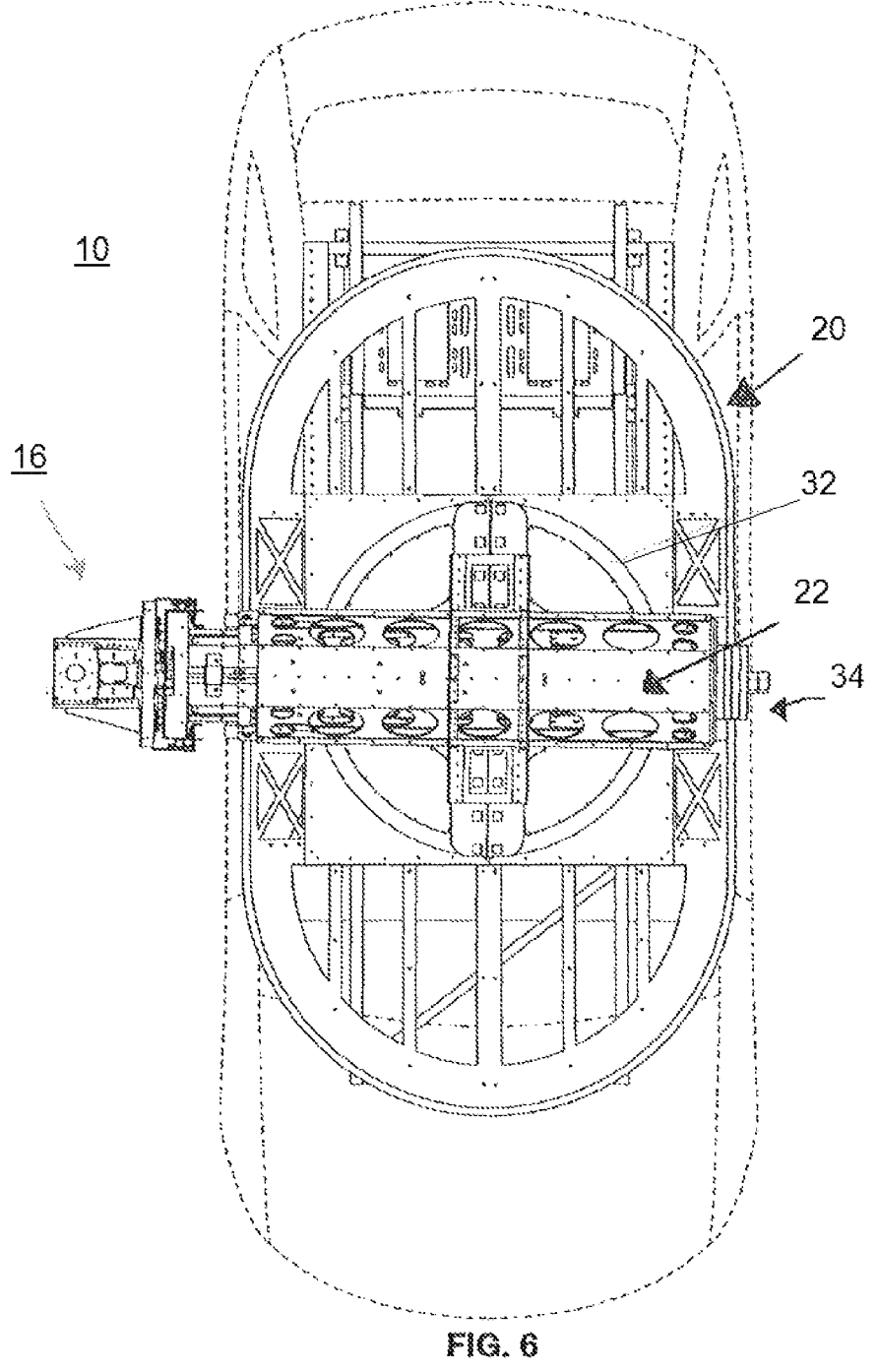
FIG. 6 is a top plan view thereof.

Finally, turning to FIG. 6 there is shown a top plan view of mounting system 10. FIG. 6 shows an embodiment of loop in plane 20 that is generally elliptical to correspond to the vehicle acting as the jib arm support 12. However, as will be appreciated, it is not limited just to generally circular or elliptical shapes since telescoping boom 22 will follow loop track in a plane 20 regardless of its shape.

Figure 7:
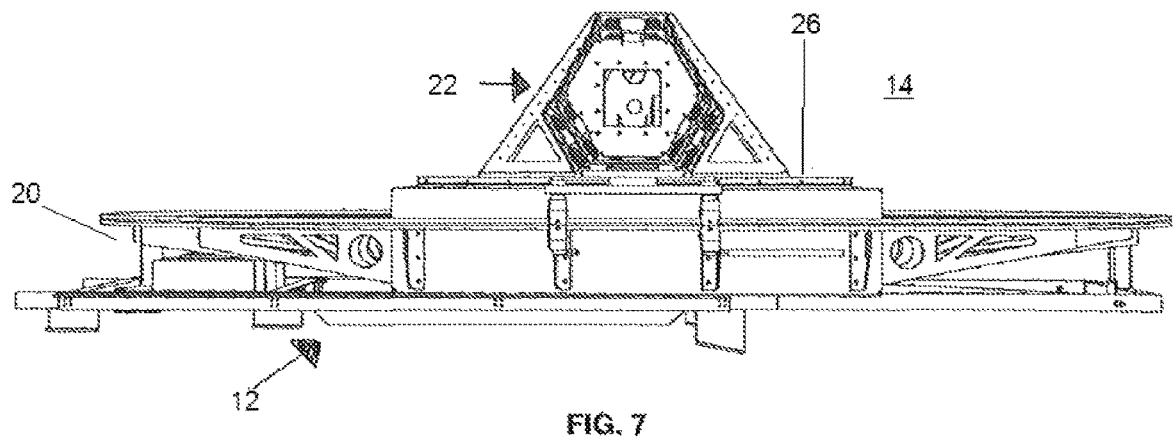
FIG. 7 is an enlarged front perspective view of a jib arm for the mounting system shown in FIG. 1 constructed according to the present inventions.

Turning now to FIG. 7 there is shown in a front perspective view of a jib arm 14 for mounting system 10. In FIG. 7, the vehicle shown in FIGS. 1-6 is not shown for the sake of clarity.

Figure 8:
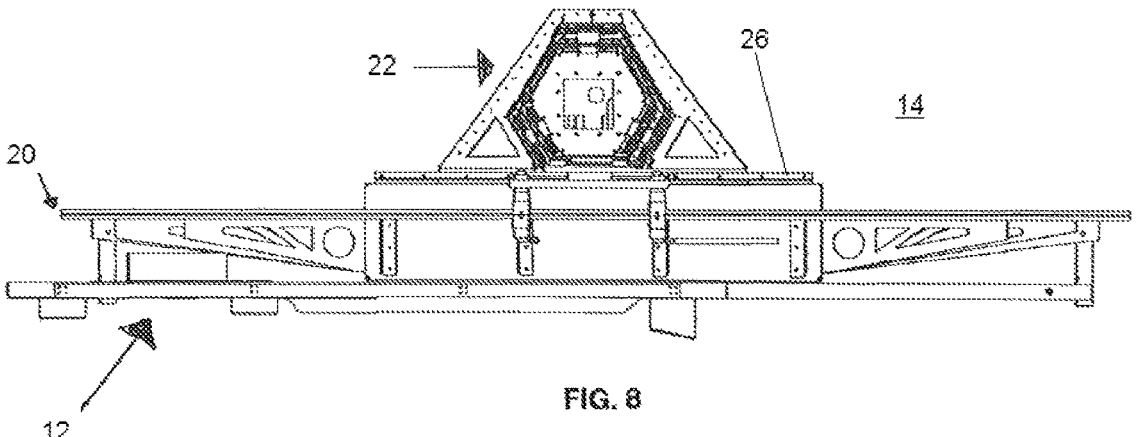
FIG. 8 is an enlarged front elevation view thereof.

Turning now to FIG. 8 there is shown an enlarged front elevation view of jib arm 14.

Figure 9:
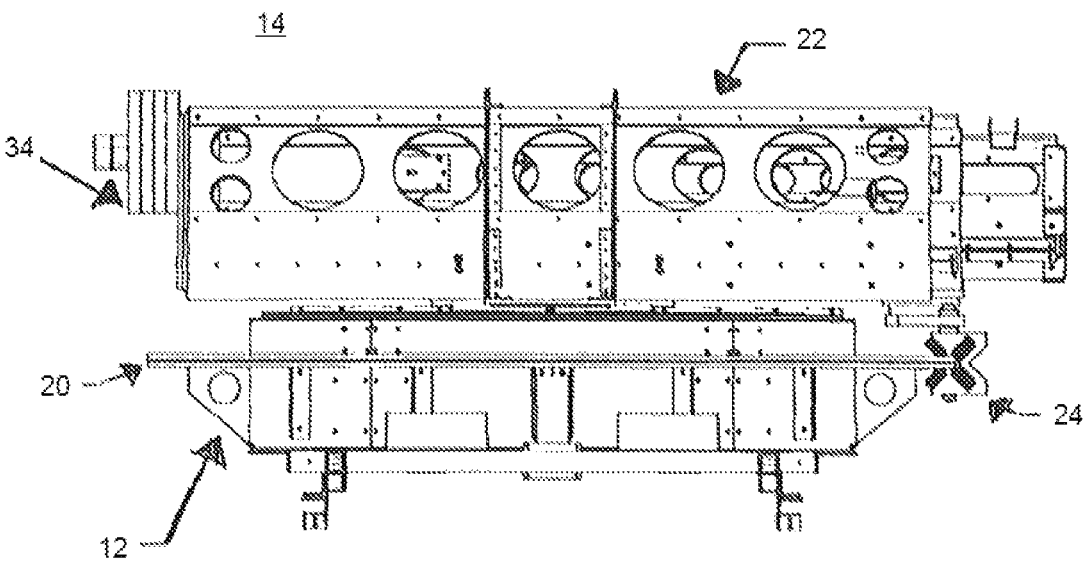
FIG. 9 is an enlarged left side elevation view thereof.

Turning to FIG. 9 there is shown an enlarged side elevation view of jib arm 14 for mounting system 10. The enlarged left side elevation view of FIG. 9 illustrates the distal end of telescoping boom 22 and loop follower trolley 24 as well as loop track in a plane 20. In addition, the weight plates of counterweight 34 on the proximate end of telescoping boom 22 are also clearly shown.

Figure 10:
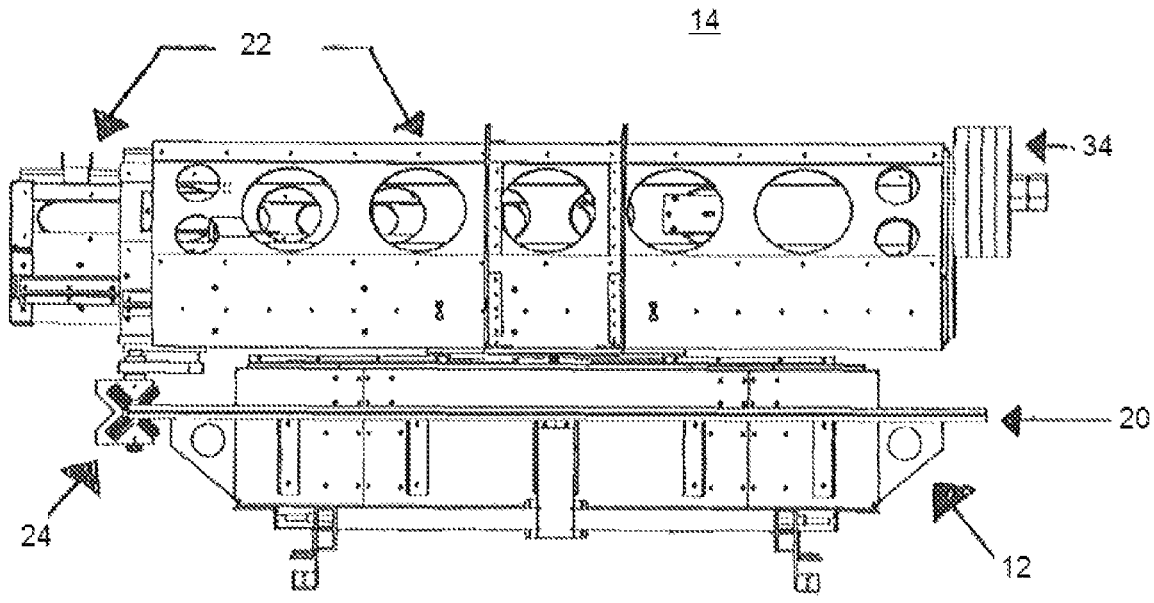
FIG. 10 is an enlarged right side elevation view thereof.

Turning now to FIG. 10 there is shown an enlarged right side elevation view of jib arm 14 for mounting system 10. FIG. 10 the mirror image of FIG. 9.

Figure 11:
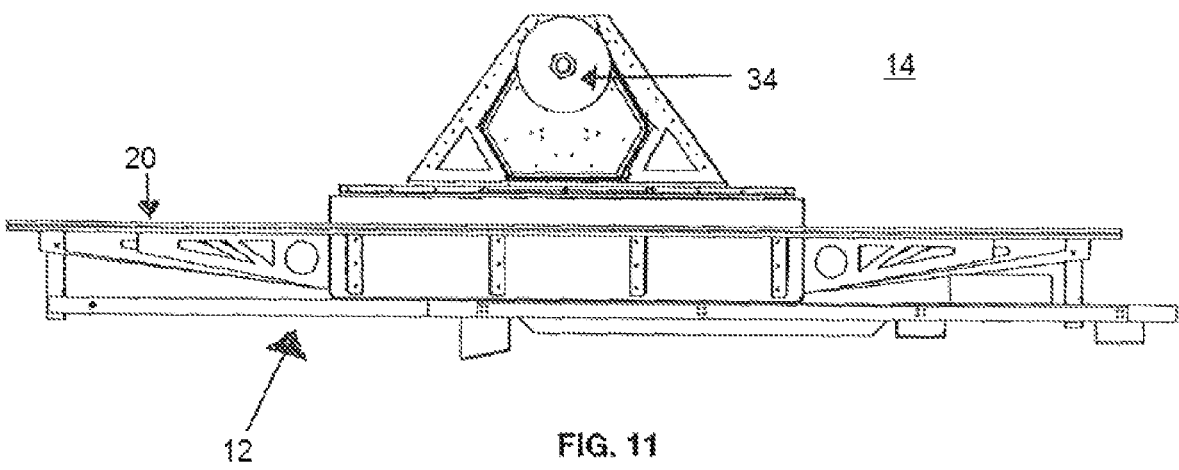
FIG. 11 is an enlarged rear elevation view thereof.

Turning now to FIG. 11 there is shown an enlarged rear elevation view of jig arm 14 for mounting system 10 generally corresponding to the elements shown in FIG. 8.

Figure 12:
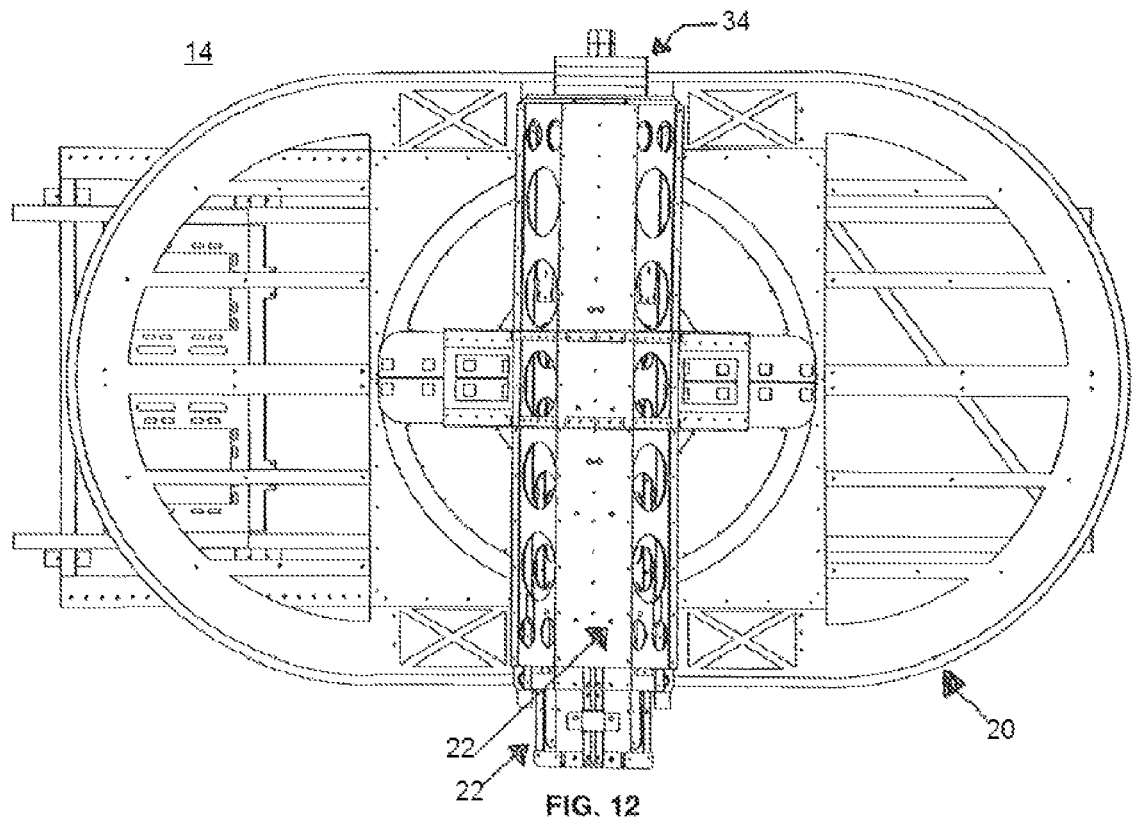
FIG. 12 is an enlarged top plan view thereof.

Finally turning to FIG. 12 there is shown an enlarged top plan view of jib arm 14 for mounting system 10. FIG. 12 generally corresponds to FIG. 6.

Figure 13:
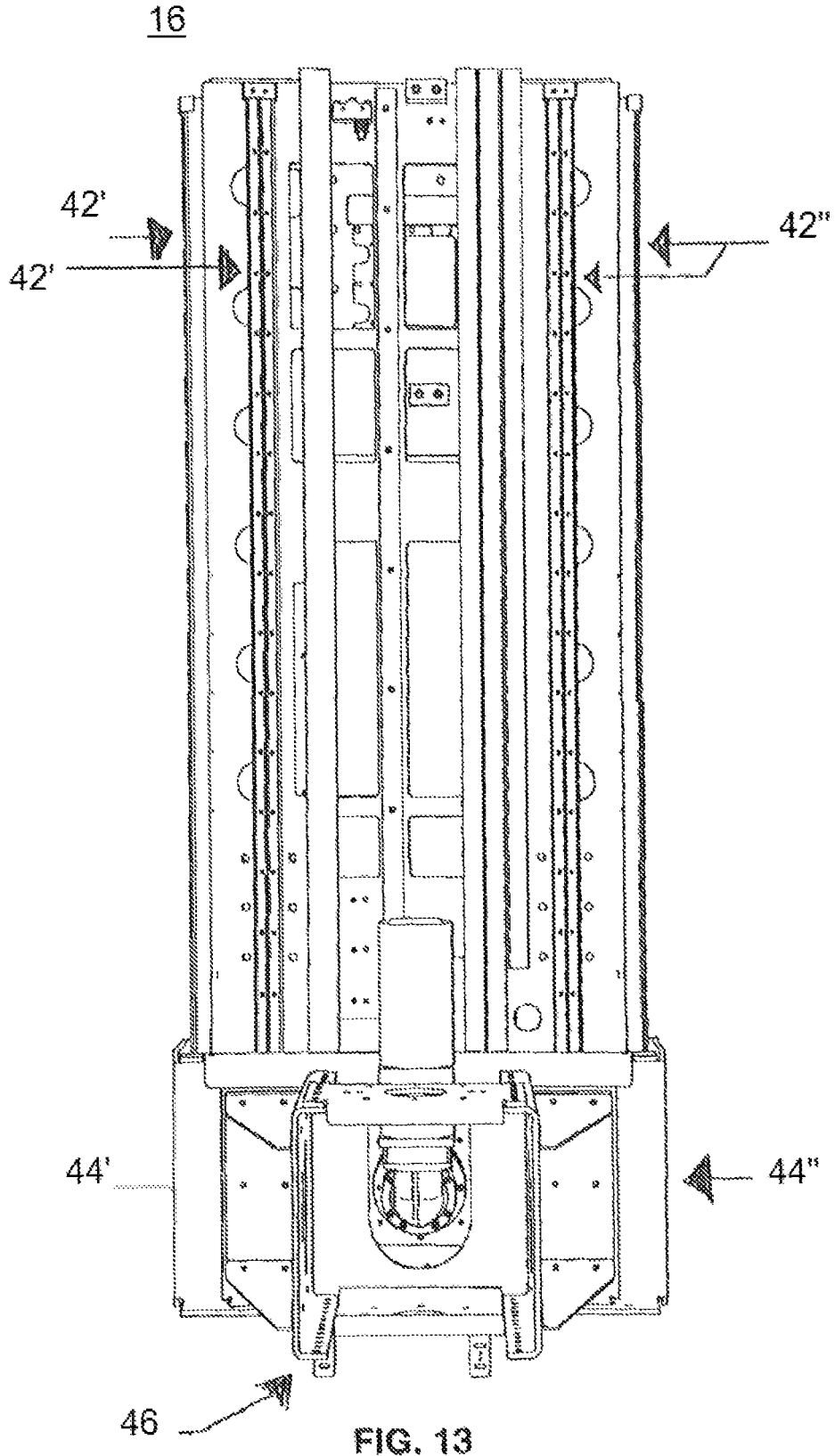
FIG. 13 is an enlarged front perspective view of an elevator for the mounting system shown in FIG. 1 constructed according to the present inventions.

Turning now to FIG. 13 there is shown an enlarged front perspective view of elevator 16 for mounting system 10. As can be seen, elevator 16 includes a pair of substantially parallel elevator tracks 42' and 42". Elevator trolley wheels 44' and 44" rides along elevated tracks 42' and 42". Camera mount 46 is attached to elevated trolley 44. Further details will be discussed below.

Figure 14:
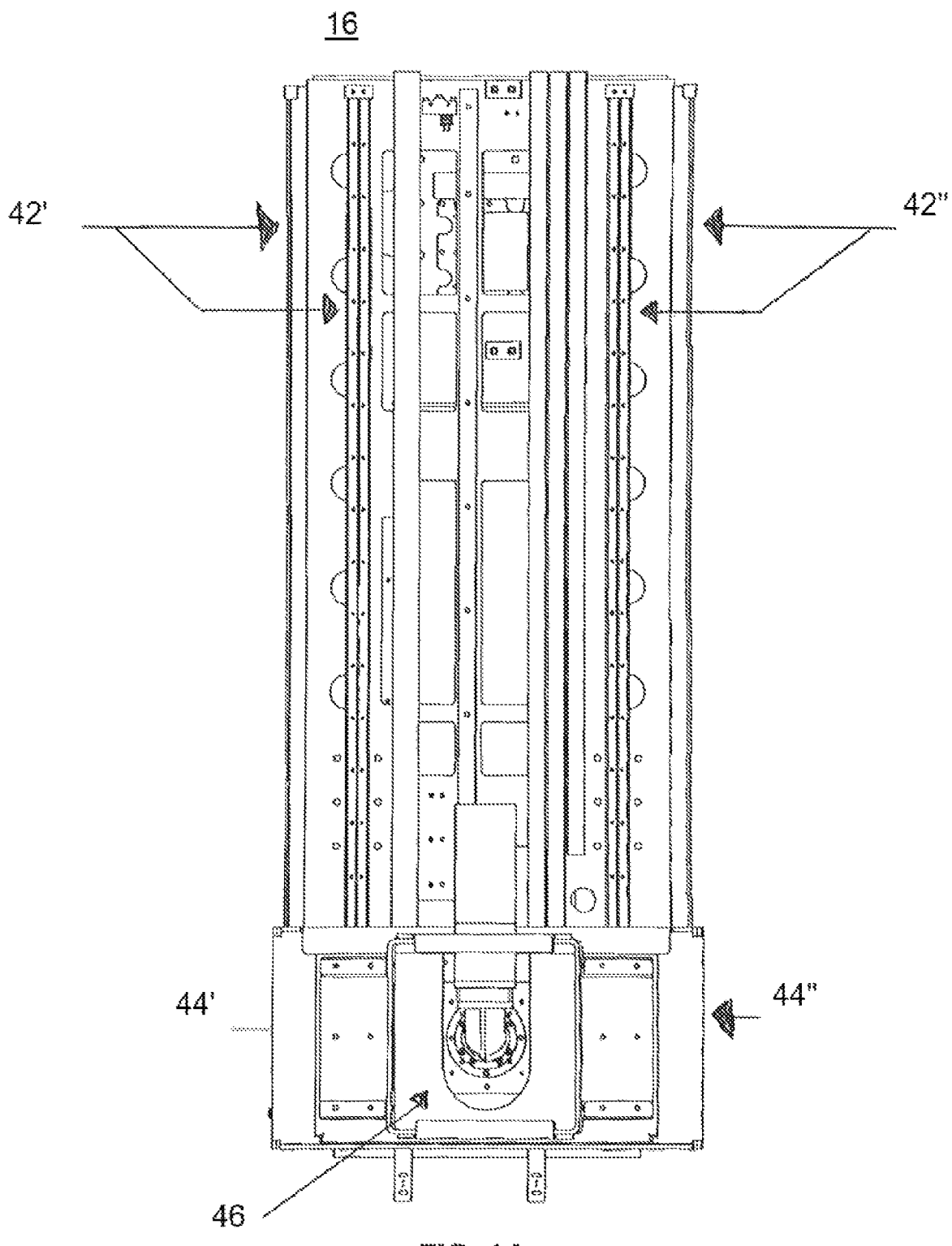
FIG. 14 is an enlarged front elevation view thereof.

Turning now to FIG. 14 there is shown an enlarged front elevation view of elevator 16 for mounting system 10.

Figure 15:
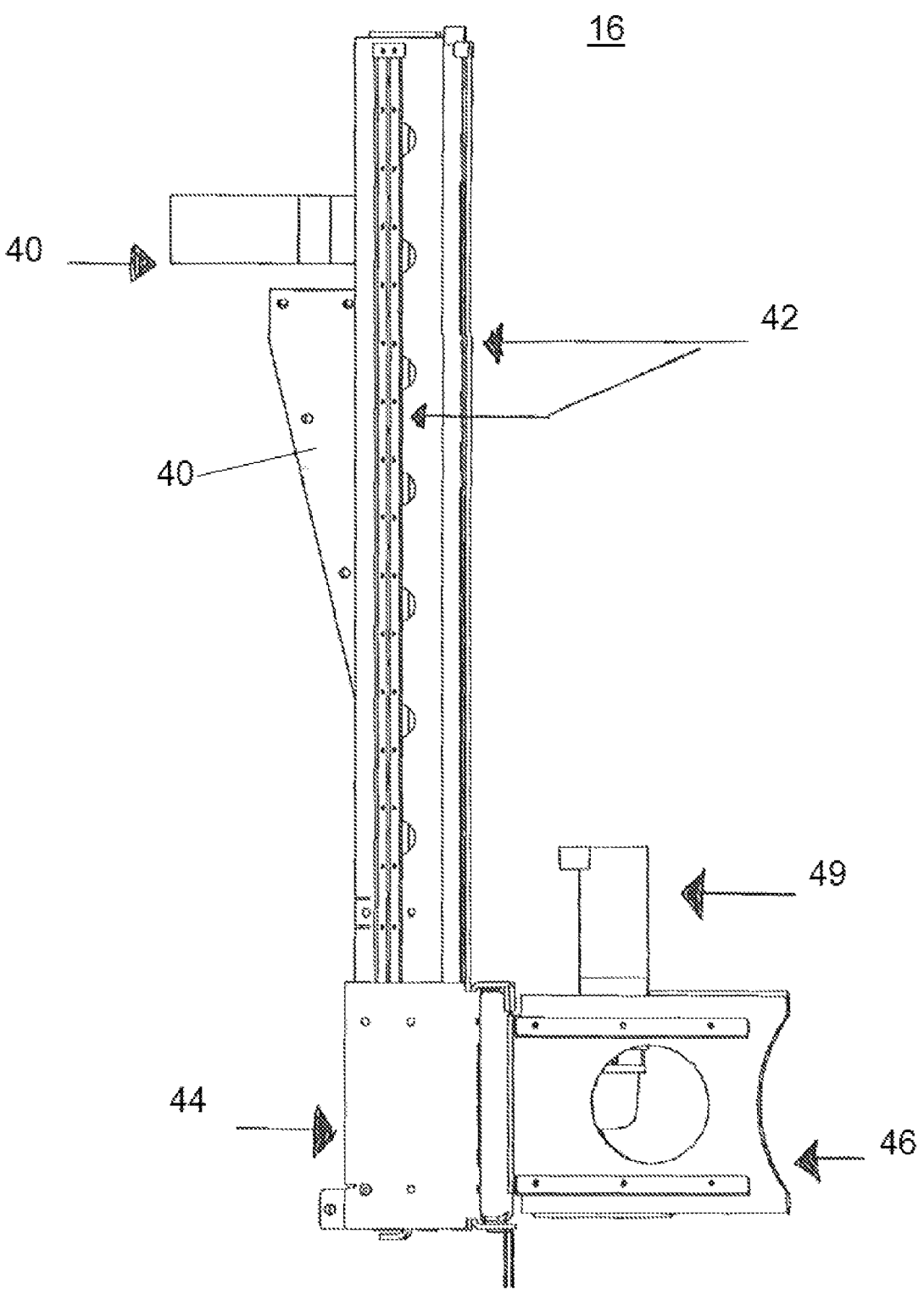
FIG. 15 is an enlarged left side elevation view thereof.

Turning now to FIG. 15 there is shown an enlarged left side elevation view of elevator 16. In this particular embodiment two separate motors 48, and 49 are utilized to provide a "stage one" movement and a subsequent "stage two" movement of the elevator 16. This structure is similar to a triple extension ladder in which there is a base, and the first stage moves with respect to the base and then the second stage moves with respect to the first stage. This arrangement allows elevator 16 to use 2 sections and reach a higher height then would be possible with only a single section while having a compact size when retracted.

Figure 16:
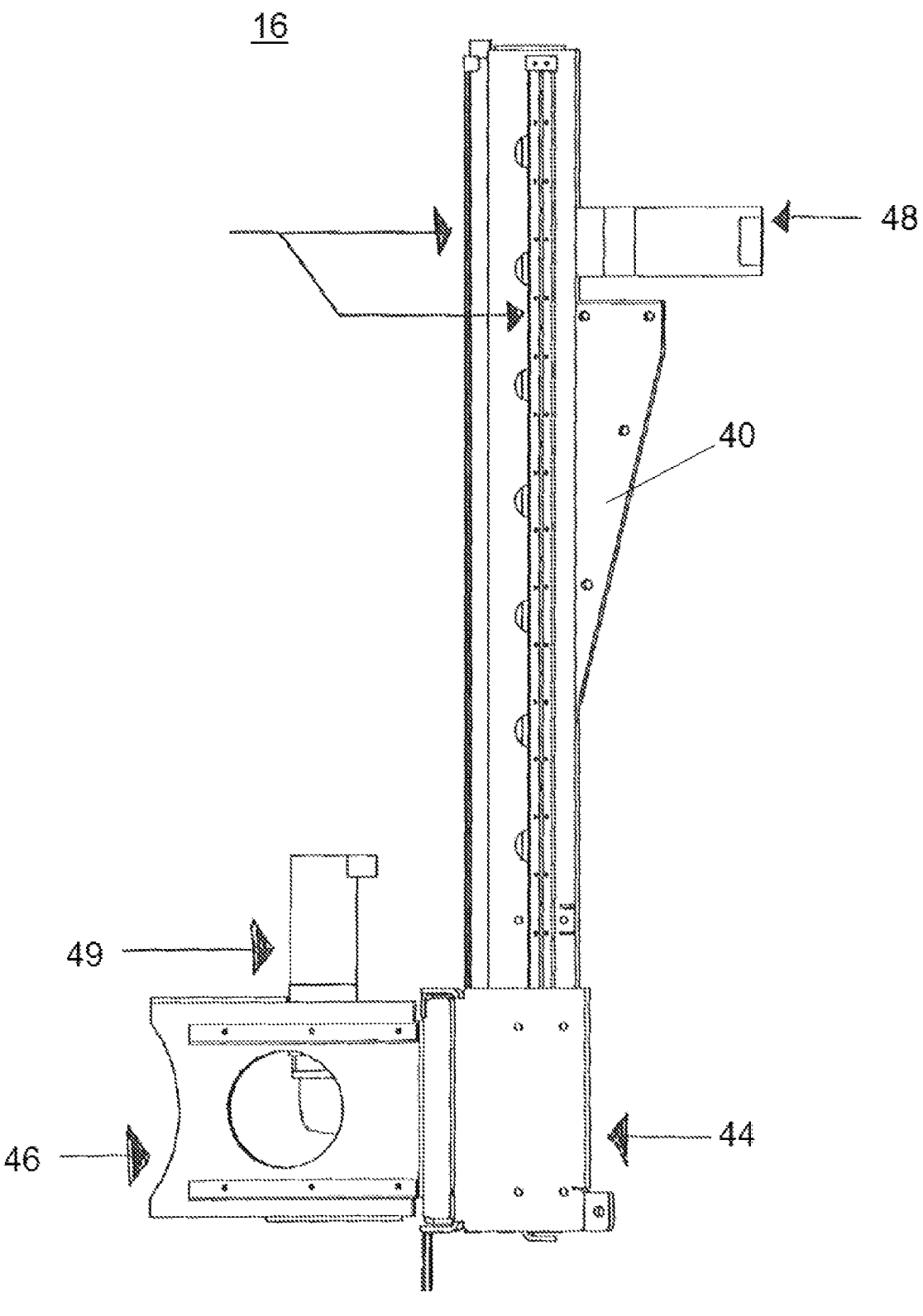
FIG. 16 is an enlarged right side elevation view thereof.

Turning now to FIG. 16 there is shown an enlarged right side elevation view of elevator 16 for mounting system 10. FIG. 16 is the mirror image of FIG. 15.

Figure 17:
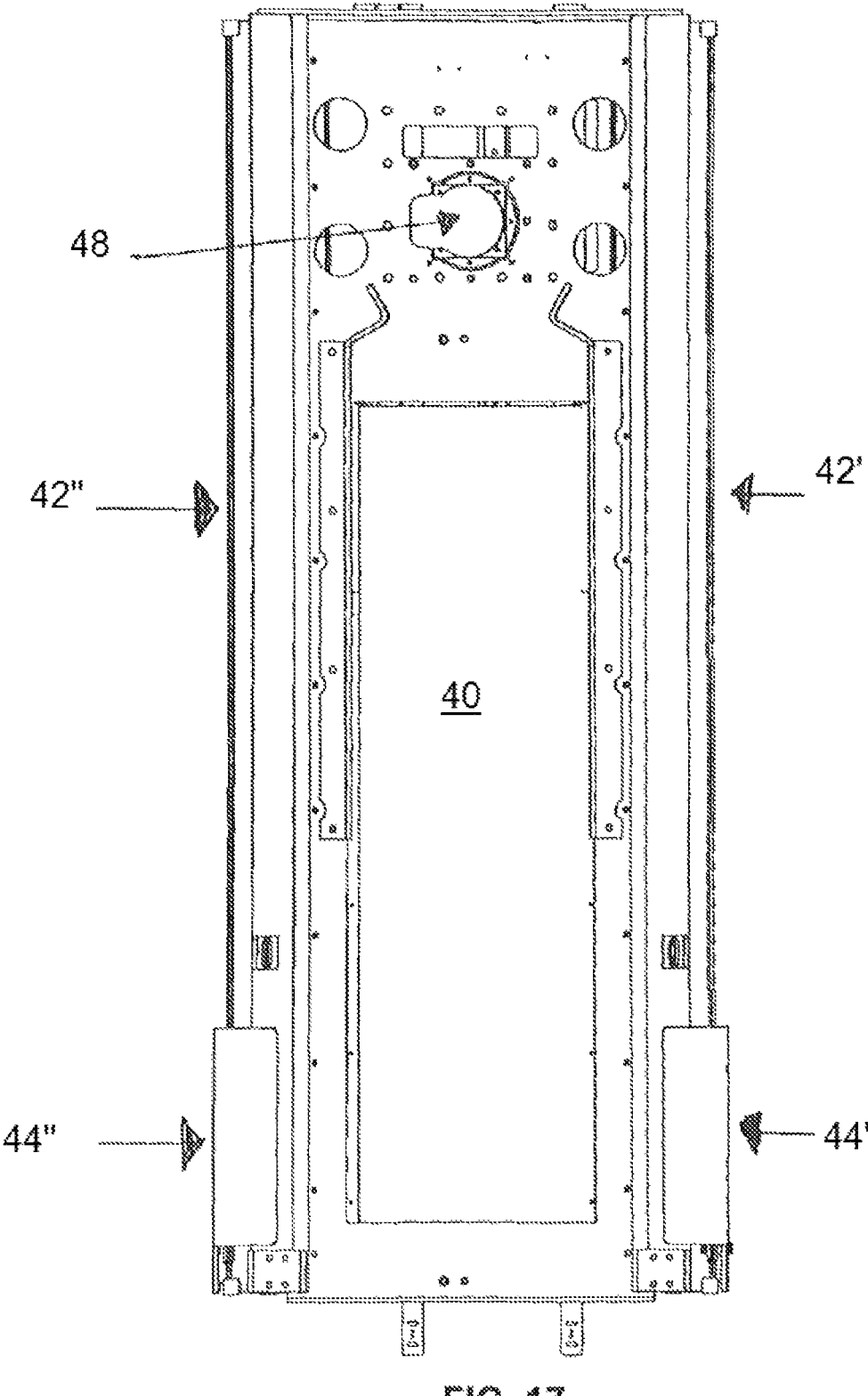
FIG. 17 is an enlarged rear elevation view thereof.

Turning now to FIG. 17 there is shown an enlarged rear elevation view of elevator 16 for mounting system 10 generally corresponding to the elements shown in FIG. 14 and further illustrating elevator base 40.

Figure 18:
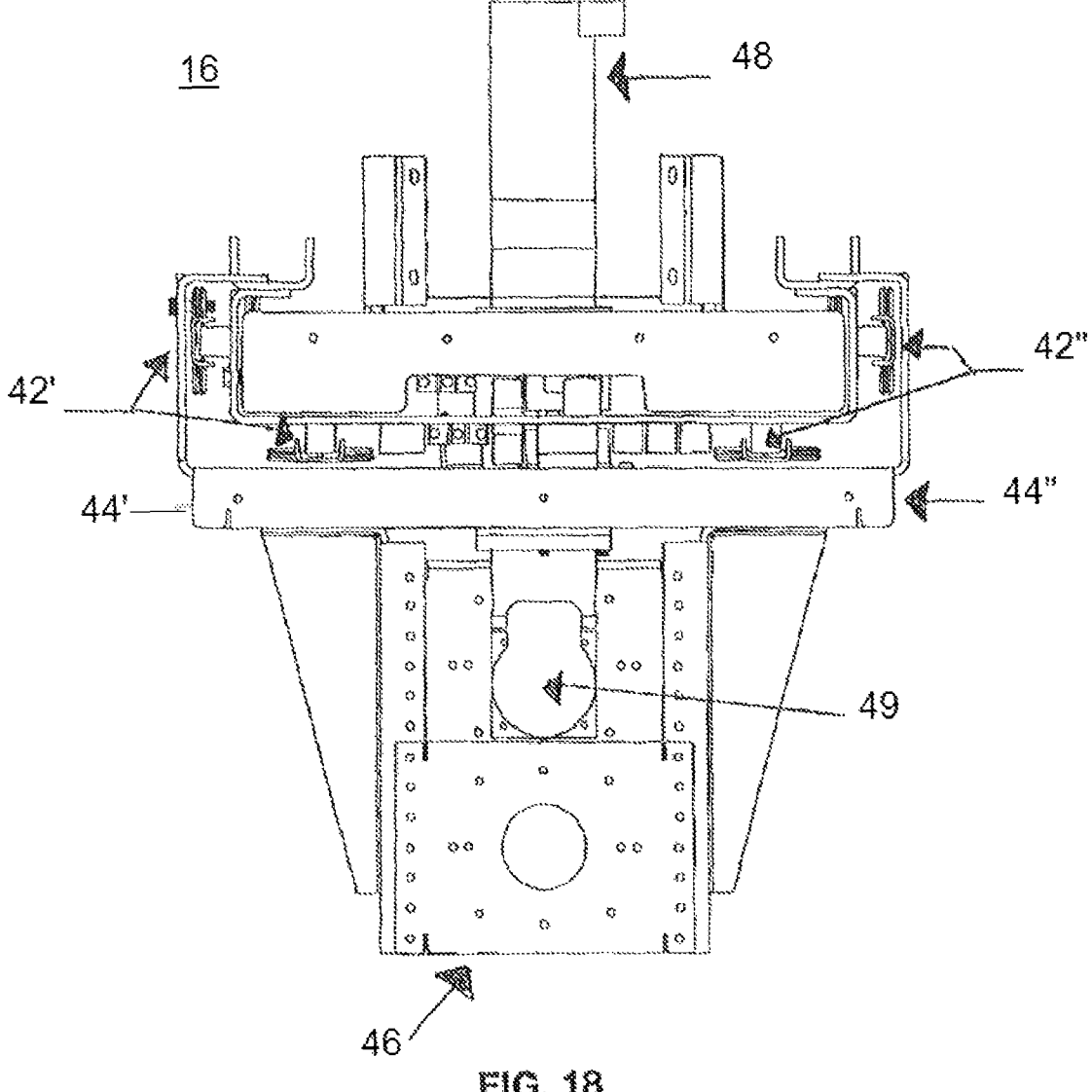
FIG. 18 is an enlarged top plan view thereof.

Finally turning to FIG. 18 there is shown an enlarged top plan view of elevator 16 for mounting system 10. Further details of elevator tracks 42' and 42" and elevator trolley wheels 44' and 44" are illustrated in this figure.

Figure 19A:
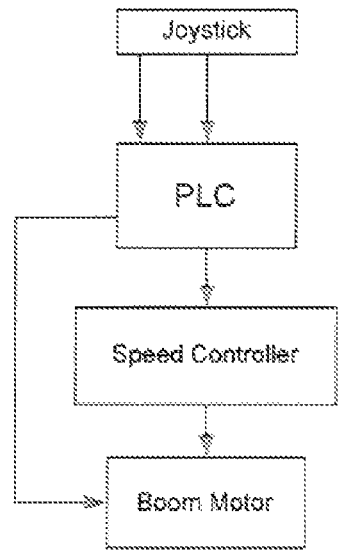
FIG. 19A is a schematic for a control system for the mounting system shown in FIG. 1.
Figure 19B:
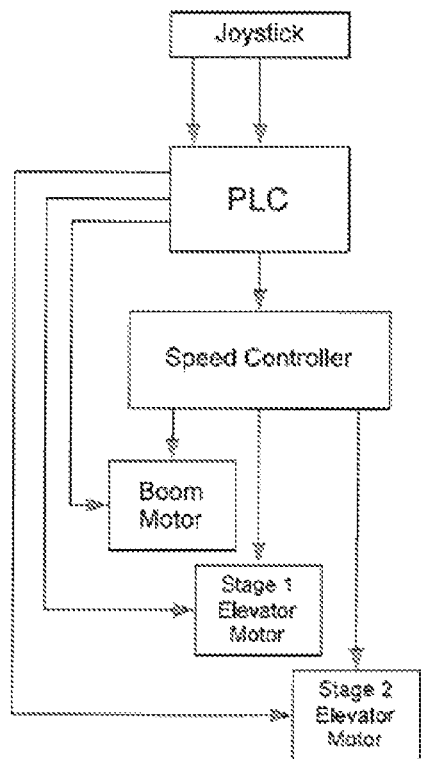
FIG. 19B is a schematic for a control system for the mounting system shown in FIG. 1.

Now turning to FIGS. 19A and 19B, an example of a control system for the present inventions can be seen. As seen in FIG. 19A a simple embodiment of the control system includes a joystick connected to a programmable logic controller. The programmable logic controller provides input to the speed controller for the boom motor and also is connected directly to the boom motor for position. Thus both the speed moving to a new position and the position itself of the boom motor may be controlled.

Turning now to FIG. 19B this schematic further includes providing additional inputs to "stage one" elevator motor and "stage two" elevator motor to also provide both the speed moving to a new position and the position itself control signals.

In certain examples, a pulley system by which the telescoping boom 22 may maintain the position of its immediate section with respect to the proximate and distal section ends of telescoping boom 22. This structure is similar to a triple extension ladder in which there is a base and the base and the second stage both move together with respect to the first stage. This arrangement provides additional strength and rigidity when the telescoping boom 22 is not fully extended.

In one embodiment, the multi-stage telescoping boom further includes a pair of spaced apart pulley wheels attached to the intermediate section for connecting the intermediate section and the distal section and a looped cable supported by the pair of spaced apart pulley wheels; wherein the intermediate section and the distal section are attached to opposite portions of the looped cable, whereby the intermediate section for connecting the intermediate section and the distal section is connected to the loop follower and is adapted to extend and to retract both the intermediate section and the distal section in response to the position of the loop follower on the loop track.

In operation, the camera car driver first unloads the jib arm camera vehicle from its transport trailer. Next the proper remote head and camera is affixed to the camera mount by the camera operator or operators. Once everything is mounted and ready to shoot, the shot or sequence is discussed with the film director and cinematographer The shot may be of a car or cars, moving, an actor on a bicycle or motorcycle, an actor running or walking or simply shooting the scenery while moving. Once the shot has been designed or choreographed, the camera car driver will move the jib arm camera vehicle to "Number 1" (starting position).

On their action cue the camera car driver, the camera operator and the jib arm operator will use their equipment and skills in a combination of driving; panning and tilting the camera; and moving the jib arm around the vehicle and up and down in order to achieve the desired shot/result.

Once the shot or sequence has been completed, the camera car driver will bring the car back to Number 1 and prepare for take 2 or a new shot/sequence. After completion of the shots/sequences, the remote head and camera will be removed from the camera mount and the camera car driver will put the jib arm camera vehicle back on its transport trailer to be moved as needed.

Certain modifications and improvements will occur to those skilled in the art upon a reading of the foregoing description. By way of example, a single motor elevator could be used where less height is needed or where a single motor is adequate to move both stage one and stage two. In addition, the loop in a plane may be resized to be more generic for attachment to multiple types of jib arm supports in addition to a SUV or the like. Also, while the boom embodiments discussed above are directed to a two-stage telescoping boom, the boom may be a single-stage or multiple-stage boom since additional stages may be stacked one upon another. Also, while a single loop in a plane is discussed above, one or more loops in a plane could be utilized for additional support or additional travel of the boom. It should be understood that all such modifications and improvements have been deleted herein for the sake of conciseness and readability but are properly within the scope of the following claims.

I claim:

1. A jib arm adapted to receive a camera or the like and for moving in a mechanically-controlled path, said apparatus comprising: (a) a jib arm support; (b) a loop assembly attached to said jib arm support, said loop assembly including (i) a continuous loop track laid out in a closed plane path;

7

(ii) a boom and (iii) a loop follower mechanically connected between said loop track and said boom for coupling said boom to said loop track, wherein said loop follower is adapted to translate along said loop track and guide said boom in a predetermined horizontal trajectory; and (c) elevator assembly attached to said boom for receiving the camera, wherein said elevator assembly comprising a mechanical lift mechanism adapted to provide controlled vertical displacement of said camera independently of said motion of said loop follower along said loop track, and wherein said loop assembly and elevator assembly together provide coordinated multi-axis movement of said camera in a repeatable and mechanically-controlled path.

2. The apparatus according to claim 1, wherein said elevator assembly includes (i) a base attached to the distal end of said boom; (ii) a set of tracks laid out onto said base; (iii) and a camera dolly for receiving a camera or the like and adapted to move along said set of tracks.

3. The apparatus according to claim 2 further including a camera mount attached to said dolly.

4. The apparatus according to claim 3, wherein said camera mount is adapted to receive devices selected from the group consisting of lights, cameras, microphones and combinations thereof.

5. The apparatus according to claim 1, wherein said jib arm support is a stationary unit selected from the group consisting of scaffolding, tripods, tables and combinations thereof.

6. The apparatus according to claim 1, wherein said jib arm support is movable.

7. The apparatus according to claim 6, wherein said movable jib arm support is selected from the group consisting of trailers, dollies, motor vehicles and combinations thereof.

8. In a jib arm adapted to receive a camera or the like and for moving in a mechanically-controlled path and including a jib arm support, the improvement comprising: a loop assembly attached to said jib arm support, said loop assembly including (i) a loop track laid out in a plane; (ii) a horizontally mounted and fixed multi-stage telescoping boom having a proximate section, a distal section, and an intermediate section connecting said proximate section and said distal section and (iii) a loop follower connected between said loop track and said horizontally mounted boom for coupling said boom to said loop track, and wherein said multi-stage telescoping boom further includes a pair of spaced apart pulley wheels attached to said intermediate section for connecting said intermediate section and said distal section and a looped cable supported by said pair of spaced apart pulley wheels; wherein said intermediate section and said distal section are attached to opposite portions of said looped cable, whereby said intermediate section for connecting said intermediate section and said distal section is connected to said loop follower and is adapted to extend and to retract both said intermediate section and said distal section in response to the position of said loop follower on said loop track.

9. The apparatus according to claim 8, wherein said loop track laid out in a plane is horizontally circular mounted.

10. The apparatus according to claim 8, wherein said loop track laid out in a plane is elliptical.

11. The apparatus according to claim 10, wherein said loop track laid out in a plane generally corresponds to the shape of the outer perimeter of said jib arm support to which said loop assembly is attached thereto.

12. The apparatus according to claim 11, wherein the shape of the outer perimeter of the jib arm support to which said loop assembly is attached thereto is a generally circular, elliptical, square, rectangular, triangular, hexagonal or similar geometric shape.

13. The apparatus according to claim 11, including a counterweight attached to the proximate end of said boom.

14. The apparatus according to claim 11, wherein said boom is formed in a hexagonal cross-section.

15. The apparatus according to claim 11, including a mounting assembly attached to the proximate end of said boom.

* * * * *